No. 12,328. REISSUED MAR. 21, 1905.
R. H. COLLINS.
PERPETUAL OR TEMPORARY BINDER FOR BOOKS, MUSIC, &c.
APPLICATION FILED OCT. 26, 1904.
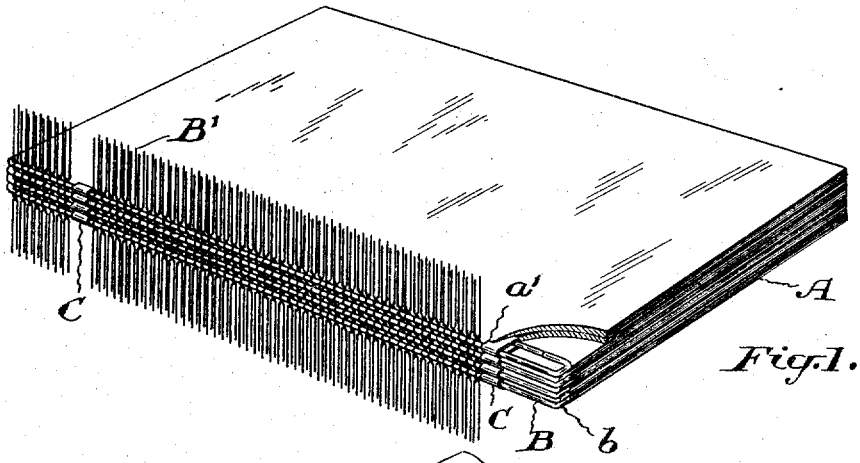
Fig. 1.
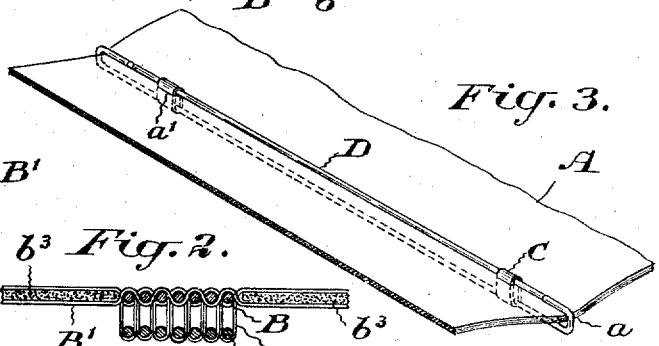
Fig. 3.
Fig. 6.
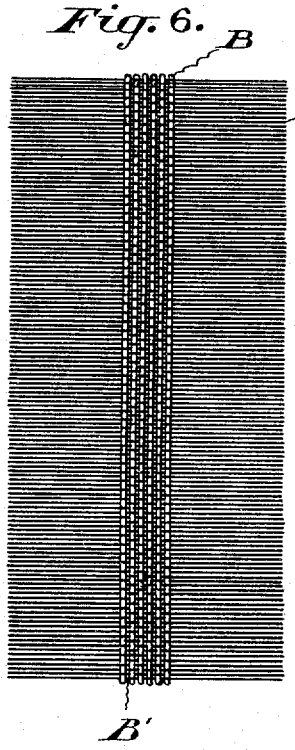
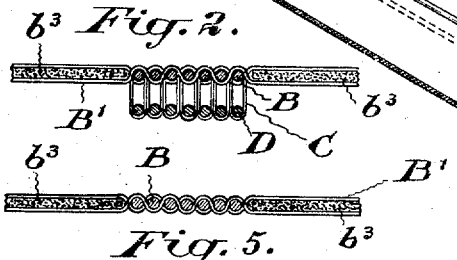
Fig. 2.
Fig. 5.
Fig. 4.
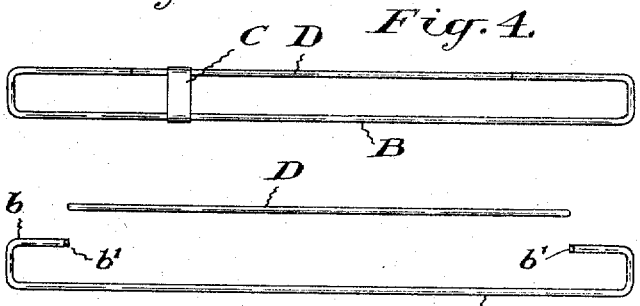
Fig. 7.
Witnesses.
W. G. McMillan.
Robert K. Collins
Inventor.
Robert H. Collins
by Rickout & Maybee
Attorneys
PHOTO-LITHOGRAPHED BY SACKETT & WILHELMS LITHO. & PTG. CO. NEW YORK.

No. 12,328. Reissued March 21, 1905.

UNITED STATES PATENT OFFICE.

ROBERT H. COLLINS, OF TORONTO, CANADA.

PERPETUAL OR TEMPORARY BINDER FOR BOOKS, MUSIC, &c.

SPECIFICATION forming part of Reissued Letters Patent No. 12,328, dated March 21, 1905.

Original No. 770,711, dated September 20, 1904. Application for reissue filed October 26, 1904. Serial No. 230,040.

*To all whom it may concern:*

Be it known that I, ROBERT HIPWELL COLLINS, of the city of Toronto, in the county of York, Province of Ontario, Canada, have invented certain new and useful Improvements in Perpetual or Temporary Binders for Books, Music, and the Like, of which the following is a specification.

My invention relates to perpetual or temporary binders for books, music, or the like.

The object of my invention is to devise simple, cheap, efficient, and secure, yet readily-adjustable, means for binding one or more folded sheets or sets of sheets into a book, which will allow of the leaves being opened flat, which will dispense with sewing, and in which any number of folded leaves or sets of leaves may be removed and other folded leaves or sets of leaves substituted in their place without destroying the binding of the book; and it consists, essentially, of a woven back having its weft formed wholly or in part of metal rods having their ends bent and turned parallel to the main parts of the rods, being thus adapted to engage and hold the folds of the leaves or sheets. For additional security I employ retaining-wires engaged with the bent ends of the weft-rods and, further, employ metal loops embracing the weft-rods extending through a slot or slots at the fold of the leaves or sheets and having the retaining-wires passing through their projecting portions within the folds of the leaves, substantially as hereinafter more specifically described and then definitely claimed.

Figure 1 is a perspective view of a portion of a book, showing my invention. Fig. 2 is a cross-section through the back, showing the weft-rods, loops, and retaining-wire. Fig. 3 is a perspective view of a portion of a set of leaves, showing the loop, the weft-rod, and retaining-wire. Fig. 4 is a detail of a weft-rod and retaining-wire with a loop thereon. Fig. 5 is a view similar to Fig. 2 without the loops and retaining-wires. Fig. 6 is a back view of the woven back without loops. Fig. 7 is a detail of a weft-rod with the retaining-wire removed, showing also the sockets in the bent ends of the weft-rod for the ends of the retaining-wire.

In the drawings like letters of reference indicate corresponding parts in the different figures.

A represents a set of leaves folded at $a$ and provided with slots $a'$, extending through the leaves at the fold.

B is a weft-rod which is provided with the bent ends $b$, having sockets $b'$. The rods B are preferably formed of spring-steel and, as will be seen on reference to Figs. 1 and 2, form the weft-rods for the woven back B', the warp of which is formed of thread, cord, or tape, either silk, linen, or cotton, or else of wire. The ends of the warp may be fastened to pieces $b^3$ of leather or canvas forming the weft, which are secured to the boards forming the cover of the book in any suitable manner, thereby securely holding the weft-rods tightly in the back.

C represents a set or sets of metal loops which embrace the weft-rods B and extend through the slots $a'$ at the folded portions of the leaves.

D represents wires, preferably of spring metal, which are designed to be removable and are passed through the inner ends of the loops C into the sockets $b'$ in the bent ends $b$ of the weft-rods B. The retaining-wire D serves to hold the folded leaves or sheets securely in position.

In order to remove each set of leaves, it is merely necessary to spring out one of the retaining-wires D from the sockets $b'$, when the set of leaves may be readily withdrawn from between the ends $b$ of the rod B.

It will now be seen that when any set of leaves is filled up by writing or other matter a new set of leaves may be readily substituted when desired. Music or other folded matter when required to be bound in permanent book form is readily removed and new matter substituted.

It is evident that while the use of the retaining-wires D and the loops C is necessary to secure strength in large and heavy books, yet for a temporary binder for music, law-books and the like the retaining wires and loops may be dispensed with.

My invention, it will be seen, lies particularly in the woven back having its weft formed of metal rods and in adapting these rods to engage the leaves or sheets to be bound.

It will be noted that a back can be woven with any number of weft-rods, each weft-rod representing a section of sheets or folded leaves.

I lay no claim to the retaining-wires other than in combination with my particular constructions.

What I claim as my invention is—

1. In a binder a woven back having any suitable warp and a metal weft-rod held therein, having its ends bent and turned back parallel to the body of the rod, substantially as described.

2. In a binder a woven back having any suitable warp and a metal weft-rod held therein, having its ends bent and turned back parallel to the body of the rod, in combination with a retaining-wire having detachable connections with the said bent ends, substantially as described.

3. In a binder a woven back having any suitable warp and a metal weft-rod held therein, the rod being provided with means whereby it may be detachably engaged with the leaves to be bound, substantially as described.

4. In a binder the combination with folded leaves or sections, each having a slot cut through it at the fold, of a woven back; rods connected with the said back; loops embracing the rods and extending through the slots; and retaining-wires extending through the loops at the inside of the folds, substantially as described.

5. In a binder the combination with a folded leaf or set of leaves having a slot extending through the leaves at the fold of a rod having bent ends, said ends having sockets therein; a loop embracing the weft-rod and extending through the slot at the fold; and a retaining-wire extending to the inside of the fold and through the inner end of the loop into the sockets at the ends of the rod, substantially as described.

6. In a binder the combination with the woven back having metal weft-rods held therein and provided with bent ends, said ends having sockets therein and a set of leaves extending under the bent ends of the rods and folded opposite the rods; and a retaining-wire for each section extending into the sockets in the bent ends of the rod, substantially as described.

7. In a binder the combination with the woven back having metal weft-rods held therein and provided with bent ends, said ends having sockets therein and a set of leaves extending through the bent ends of the rods and folded opposite the rods, and provided with a slot at the fold; a loop embracing the rods, and extending through the slot; and a retaining-wire extending through the loop at the inside of the fold and fitting into sockets in the bent ends of the rod, substantially as described.

8. In a binder a woven back having any suitable warp and metal weft-rods held therein, each rod having its ends bent and turned back parallel to the body of the rod, substantially as described.

Toronto, October 19, 1904.

ROBERT H. COLLINS.

In presence of—

JOHN G. RIDOUT,
A. M. MCRAE.